(12) United States Patent
Bergmann (10) Patent No.: US 11,660,829 B2
(45) Date of Patent: May 30, 2023

(54) METHOD OF SEAMLESSLY BAGGING COMPOSITE PARTS

(71) Applicant: Spirit AeroSystems, Inc., Wichita, KS (US)

(72) Inventor: Blaise Bergmann, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 18 days.

(21) Appl. No.: 17/171,628

(22) Filed: Feb. 9, 2021

(65) Prior Publication Data

US 2022/0250341 A1   Aug. 11, 2022

(51) Int. Cl.
  *B29C 70/44*   (2006.01)
  *B29C 70/34*   (2006.01)
  *B29C 33/48*   (2006.01)

(52) U.S. Cl.
  CPC .......... *B29C 70/446* (2013.01); *B29C 33/485* (2013.01); *B29C 70/342* (2013.01)

(58) Field of Classification Search
  CPC .............................. B29C 70/446; B29C 70/342
  See application file for complete search history.

(56) References Cited

U.S. PATENT DOCUMENTS

| | | | |
|---|---|---|---|
| 2,141,610 A * | 12/1938 | Little | B65H 49/36 |
| | | | 242/593 |
| 2,838,796 A * | 6/1958 | Reed | B30B 5/02 |
| | | | 264/315 |
| 2,999,780 A * | 9/1961 | Perrault | B29C 70/446 |
| | | | 156/74 |
| 3,033,730 A * | 5/1962 | Martin | B29D 23/001 |
| | | | 264/319 |
| 3,257,690 A * | 6/1966 | Scott | B29C 33/505 |
| | | | 425/DIG. 60 |

(Continued)

FOREIGN PATENT DOCUMENTS

FR   2 944 224 A1   10/2010

OTHER PUBLICATIONS

"Vacuum Bagging Systems and Accessories for Manufacturing Composites and Laminates of all types", TORR, Pp. 59 (Oct. 16, 2003).

(Continued)

*Primary Examiner* — Matthew J Daniels
(74) *Attorney, Agent, or Firm* — Hovey Williams LLP (57) ABSTRACT

A method and system for manufacturing composite parts free of wrinkles and mark-offs from bagging compression. The method can include placing composite material around a rigid mandrel and sealing opposing end of an elastomeric hollow membrane within a rigid external vessel. Then the method can include inflating the hollow membrane from a natural state to an inflated state. In the natural state, the hollow membrane can have a cross-section smaller than the cross section of the rigid mandrel with the composite material thereon. The method can then include inserting the rigid mandrel and the composite material into the membrane while it is in the inflated state, followed by releasing the membrane from the inflated state to naturally contract toward its natural state. Then the method can include heating the composite material to a cure temperature while the composite material is compressed by the membrane.

13 Claims, 5 Drawing Sheets

(56) References Cited

U.S. PATENT DOCUMENTS

| | | | | | |
|---|---|---|---|---|---|
| 3,608,052 | A | * | 9/1971 | Gunn | B29C 70/30 264/317 |
| 3,879,160 | A | * | 4/1975 | Miller | B29C 43/00 425/405.2 |
| 3,964,846 | A | * | 6/1976 | Bliss | B29D 29/10 425/DIG. 19 |
| 4,126,659 | A | * | 11/1978 | Blad | B29C 53/845 156/80 |
| 4,780,262 | A | | 10/1988 | Vonvolkli | |
| 4,853,172 | A | * | 8/1989 | Jacaruso | B29C 70/446 264/516 |
| 4,937,025 | A | * | 6/1990 | Foster | B29C 43/102 425/389 |
| 4,997,511 | A | * | 3/1991 | Newsom | B01J 3/006 425/389 |
| 5,071,506 | A | * | 12/1991 | Nelson | B29C 33/40 156/173 |
| 5,259,901 | A | | 11/1993 | Davis et al. | |
| 5,468,140 | A | * | 11/1995 | Hoffman | B29C 43/12 425/389 |
| 5,693,175 | A | * | 12/1997 | Jarrett | B27D 1/086 156/499 |
| 6,485,668 | B1 | * | 11/2002 | Murphy | B29C 70/086 425/389 |
| 7,228,611 | B2 | | 6/2007 | Anderson et al. | |
| 7,503,368 | B2 | | 3/2009 | Chapman et al. | |
| 7,810,670 | B2 | | 10/2010 | Carter et al. | |
| 8,114,241 | B2 | | 2/2012 | Iagulli et al. | |
| 8,419,886 | B2 | | 4/2013 | Astwood et al. | |
| 8,815,145 | B2 | | 8/2014 | Everhart et al. | |
| 9,962,917 | B2 | | 5/2018 | Inserra Imparato et al. | |
| 10,479,032 | B2 | | 11/2019 | Lyons et al. | |
| 2017/0001338 | A1 | * | 1/2017 | Fujiwara | B29C 33/48 |

OTHER PUBLICATIONS

International Search Report and Written Opinion in related application PCT/US2022/015483 dated May 24, 2022. 10 pages.

* cited by examiner

METHOD OF SEAMLESSLY BAGGING COMPOSITE PARTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to methods and systems for seamlessly bagging composite parts during manufacturing thereof.

BACKGROUND

The manufacture of structural aircraft members from layers of thermoplastic composite materials, fiber-reinforced or otherwise, is accomplished using a number of techniques. Generally, a technique referred to as "bagging" is required for curing composite parts in an oven or autoclave, for example. Bagging involves placing a flexible impermeable or semi-impermeable membrane or film (e.g., a non-stretchable nylon film) over layers of composite, then sealing and applying a pressure differential (e.g., vacuum) to cause the composite material to be compressed via the bagging material, membrane, or film.

Typical bagging processes can be time consuming and labor intensive when using standard non-elastic bagging materials, especially on composite parts with complex geometries. In addition to labor costs, the bagging material is typically discarded after each cure cycle, adding additional recurring cost to the process. In addition to cost issues, outer surfaces of the composite part are often impacted by the final condition of the bagging material. For example, pleats are sometimes used in the bagging material to help it conform to the composite part's complex geometry and wrinkles in the bagging material usually form when vacuum is drawn inside, compressing the bagging material against the composite part. These pleats and wrinkles can cause fiber distortion and mark-off on the outer surface of the resulting composite part.

SUMMARY

At a high level, aspects herein relate to a method and system for manufacturing composite parts free of wrinkles and mark-offs from bagging compression. The method can include placing composite material around a rigid mandrel and sealing opposing end of an elastomeric hollow membrane within a rigid external vessel. Then the method can include inflating the hollow membrane from a natural state to an inflated state. In the natural state, the hollow membrane can have a cross-section smaller than the cross section of the rigid mandrel with the composite material thereon. The method can then include inserting the rigid mandrel and the composite material into the membrane while it is in the inflated state, followed by releasing the membrane from the inflated state to naturally contract toward its natural state. Then the method can include heating the composite material to a cure temperature while the composite material is compressed by the membrane.

In some embodiments, the method described herein can also include sealing opposing ends of the rigid external vessel with plugs placed into the opposing ends of the rigid external vessel. The plugs can center and hold the rigid mandrel within the rigid external vessel. Following curing of the composite material, the methods described herein can also include the steps of cooling the composite material, inflating the membrane away from the composite material, and removing the cured composite material out of the membrane.

Other embodiments herein describe a composite curing system comprising a rigid mandrel, a rigid external vessel, and a hollow membrane. The rigid mandrel can have a maximum cross-sectional size and can be configured for placement of composite material thereon. The rigid external vessel can have a minimum cross-sectional size that is larger than the maximum cross-sectional size of the rigid mandrel, such that the rigid mandrel fits within the rigid external vessel. The hollow membrane can be made of elastomeric material and can have two opposing ends at which two opposing openings are formed. The hollow membrane can be located within and sealed to the rigid external vessel at or proximate to the two opposing ends of the hollow membrane. Furthermore, the hollow membrane can be inflatable from a natural state to an inflated or expanded state via a pressure differential drawing the hollow membrane toward the rigid external vessel. A minimum cross-sectional size of the hollow membrane in the natural state can be equal to or smaller than the maximum cross-sectional size of the rigid mandrel and a minimum cross-sectional size of the hollow membrane in the inflated or expanded state can be larger than the maximum cross-sectional size of the rigid mandrel, allowing clearance of the rigid mandrel into the hollow membrane.

This Summary is provided to introduce a selection of concepts in a simplified form that are further described below in the Detailed Description. This Summary is not intended to identify key features or essential elements of the claimed subject matter, nor is it intended to be used as an aid in determining the scope of the claimed subject matter. The present invention is defined by the claims. Other aspects and advantages of the present invention will be apparent from the following Detailed Description and the accompanying drawing figures.

BRIEF DESCRIPTION OF THE DRAWINGS

Examples are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the technology herein can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In the manufacturing of composite parts, a technique called "bagging" is used for compressing layers of uncured composite material during curing of the composite part in an oven or autoclave. Bagging involves placing a flexible impermeable or semi-impermeable membrane or film (often referred to as a "bag" or "membrane" herein) over layers of composite, then sealing the bag (to itself or an impermeable surface or mold) and applying a pressure differential (e.g., vacuum) to cause the layers of composite material to be compressed via the bag. This bagging processes can be time consuming and labor intensive when using standard non-elastic bags, especially on composite parts with complex geometries. In addition to labor costs, the bag is typically discarded after each cure cycle, adding additional recurring cost to the process. Furthermore, pleats in the bag (used to help it conform to the composite part's complex geometry) or wrinkles formed in the bag when vacuum is drawn inside of it to compress the bag against the composite part can cause fiber distortion and mark-off on an outer surface of the resulting composite part.

To more quickly and efficiently bag a composite part without such fiber distortions or mark-offs, the method described herein uses an elastomeric reusable bag or tube, such as one made of silicone rubber. This bag can be sized or positioned to have a smaller diameter or cross section than the composite part to be formed thereby. For example, the bag can have periphery portions thereof attached or mounted to a rigid external vessel. Then a pressure differential such as vacuum or other mechanical stretching techniques are used to expand the bag, allowing clearance for the composite part or layers of composite material formed on a rigid mandrel to be placed therein. When vacuum or mechanical expansion thereof is then released, the bag is allowed to naturally contract back against the composite part and the rigid mandrel without creating pleats or wrinkles. The composite part can then be cured using heat, vacuum, and external pressure as required by the cure specification for that composite part. After cure is complete, vacuum or other stretching techniques can then be re-applied to stretch the bag open to allow extraction of the rigid mandrel and the cured composite part.

For example, in one embodiment an elastomeric tube bag positioned inside a rigid external vessel and has end portions sealed to the rigid external vessel. Composite material is wrapped around or laid onto a rigid mandrel of any cross-sectional shape or size. The diameter or cross-sectional size of the rigid external vessel is larger than that of the rigid mandrel and the composite material thereon, while the natural diameter or cross-sectional size of the elastomeric tube bag when it is not expanded or inflated is equal to or smaller than the diameter or cross-sectional size of the rigid mandrel and the composite material thereon. The elastomeric tube bag is then drawn by vacuum toward the rigid external vessel, thereby expanding the elastomeric tube bag to provide clearance for the rigid mandrel and the composite material thereon to be slid into the elastomeric tube bag. Thus, the elastomeric tube bag is located between the composite material and the rigid external vessel.

Then plugs or other devices can seal opposing ends of the rigid external vessel, thus supporting the rigid mandrel thereby and creating an air-tight seal between the plugs and the elastomeric tube bag. Vacuum between the rigid external vessel and the elastomeric tube bag is then released, allowing the elastomeric tube bag to contract back toward its natural diameter or cross-section. Since the elastomeric tube bag's diameter or cross-section is smaller than the rigid mandrel and the composite material thereon, the contraction occurs without the formation of any pleats or wrinkles in the elastomeric tube bag. Thus, no such fiber distortion or mark-off is created on the resulting composite part surface in contact with the elastomeric tube bag.

The composite part, compressed in this manner, can next be cured under heat and/or pressure, such as in an autoclave or oven. Additionally or alternatively, the rigid mandrel is heated such as via joule heat to cure the composite material thereon. When curing is complete, the plugs or other devices used to seal opposing ends of the rigid external vessel can be removed. Furthermore, vacuum can be drawn between the rigid external vessel and the elastomeric tube bag, expanding the elastomeric tube bag away from the cured composite part and the rigid mandrel. This allows the cured composite part and the rigid mandrel to be removed from within the rigid external vessel.

The methods described herein advantageously provide for rapid bagging of a composite part on a mandrel with minimum expenditure of labor. The reusability of the bag and the tooling associated with the methods described herein reduce processing costs compared to traditional bagging methods. Furthermore, the bag is designed to naturally conform to the surfaces of the rigid mandrel and the composite part or uncured composite material without forming any pleats or wrinkles, thus improving the final quality of an outer surface of the resulting composite part.

Figure 1:
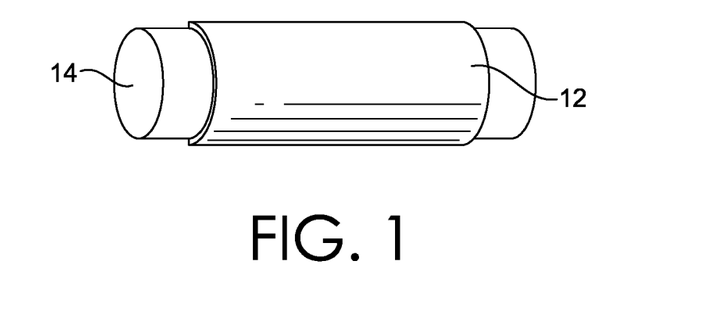
FIG. 1 is a perspective view of a rigid mandrel with composite material thereon in accordance with embodiments of the present invention.

As depicted in FIGS. 1-4, aspects herein relate to a system 10 and method of forming a composite part. First, FIG. 1 depicts composite material 12 wrapped around a rigid mandrel 14. The composite material 12 can be applied to the rigid mandrel 14 using any composite part manufacturing techniques or composite material placement techniques known in the art, such as automated tape layup (ATL), automated fiber placement methods (AFP), or various manual layup methods for forming uncured composite material onto a mold or mandrel.

In some embodiments, the composite material 12 may be, made from thermoset or thermoplastic composite material and/or can be formed using a plurality of layers of composite plies and/or composite tape. For example, composite tape or plies may be made of carbon-fiber reinforced epoxy and may specifically be a prepregged unidirectional tape or continuous strip of fabric. Additionally or alternatively, in some embodiments, one or more portions of the composite material 12 placed around the rigid mandrel 14 may include a composite skin co-cured or fused to at least one composite substructure. For example, the composite skin may be for aircraft components such as a fuselage or engine nacelle, and the substructure fused thereto may be one or more frames and/or stringers providing structural reinforcement to the composite skin. For example, divots or indents in the rigid mandrel 14 can be designed to hold the frames and/or stringers in a desired spacing and orientation prior to the composite material 12 being wrapped around the rigid mandrel 14. However, the composite material 12 and the rigid mandrel 14 can be sized, shaped and configured to form any size, shape, and type of composite part known in the art.

The rigid mandrel 14 can be configured to have the composite material 12 placed thereon or there around, such as via the composite placement methods described above. The rigid mandrel 14 can be any mandrel of any cross-sectional size and shape or can be replaced with any rigid layup tool known in the art for supporting and/or shaping composite material. For example, the rigid mandrel 14 can be made of a metal or composite or any material sufficiently rigid to maintain its shape and configuration throughout pressure and heat applied thereto during curing of the composite material 12. The rigid mandrel 14 can be hollow or solid throughout the cross-section thereof. In some embodiments, the rigid mandrel 14 can be a solid or hollow three-dimensional structure with a circular cross-section (such as a cylinder), a triangular cross-section, a rectangular cross-section, or any cross-sectional shape. The rigid mandrel 14 can be made of any rigid material such as a metal sufficiently rigid to retain its cross-sectional shape during compression and cure of the composite material 12 thereon. In some embodiments, the rigid mandrel 14 can be made of a conductive material for joule heating or the like. In other embodiments, the rigid mandrel 14 is made of a semi-conductive or non-conductive material and heat is otherwise provided to the composite material 12 during cure thereof.

In some embodiments, the system 10 can also include release film and/or a facesheet (not shown) positioned between the composite material 12 and the rigid mandrel 14, allowing for ease of separation between the rigid mandrel 14 and the composite material 12. Furthermore, in some embodiments, the release film can be applied over the composite material 12 prior to bagging thereof, as later described herein. Caul sheets can also be applied over at least part of the composite material 12 prior to bagging, depending on the requirements of the composite part being formed thereby.

The size and shape of the rigid mandrel 14 can correspond with the composite part to be formed thereon. For example, the composite part may be formed on the rigid mandrel 14 to have three-dimensional characteristics such as height, depth, curvature, contours, features that intersect at angles of varying degrees, or features that include a space between them. In some embodiments, the size of the rigid mandrel 14 can be slightly smaller than the composite part to be formed thereon in order to account for a thickness of the facesheet. For making composite parts having varying cross-sectional sizes throughout a length of the resulting composite part (e.g., a tube of irregular cross-sectional area), a maximum cross-sectional size of the rigid mandrel is used to form a portion of the composite part having the composite part's maximum cross-sectional size. However, in some embodiments, the rigid mandrel 14 can have a constant cross-sectional area throughout a length thereof (e.g., for forming a tube of a constant cross-sectional size).

Figure 2:
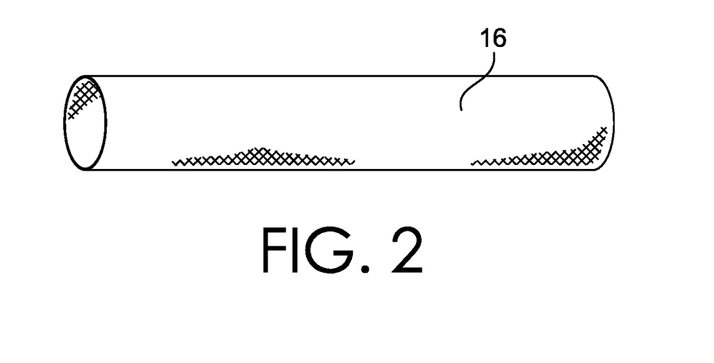
FIG. 2 is a perspective view of a hollow membrane in a natural state in accordance with embodiments of the present invention.

FIG. 2 depicts a reusable bag or hollow membrane 16 for bagging of the composite part. The membrane 16 can be an impermeable membrane of flexible material that is substantially or completely impermeable to the atmosphere and/or other gases used for compressive force. For example, the membrane 16 can be substantially impermeable to atmosphere at a pressure differential of 15 psi or in some embodiments can be impermeable to atmosphere at a pressure differential of up to 100 psi. The membrane 16 can be an elastomeric tube bag, such as a tube made of silicone rubber. The membrane should be temperature resistant to allow it to operate without degrading at 250 degrees Fahrenheit and more preferably, it should operate at 350 degrees Fahrenheit. The membrane should have an elongation that is over 50 percent and more preferably over 100 percent. However, other stretchable, flexible impermeable membranes may be used as the membrane 16 described herein without departing from the scope of the invention. In some embodiments the membrane may contain fiber-reinforcement. The fiber reinforcement may be oriented so as to contribute to a reduction in cross-sectional dimension of the membrane in response in axially stretching. Furthermore, the membrane 16 can have a non-constant cross-sectional size or shape over the length thereof, and can include, for example, protruded or indented portions therein to allow for different features of the composite part, such as substructures (not shown) like frames or stringers extending outward from the composite material 12 or components for co-curing to the composite material 12.

The membrane 16 can be configured for placement outward of the composite material 12 and the rigid mandrel 14 when it is in an inflated or expanded state and to compress the composite material 12 against the rigid mandrel 14 when it released from its inflated or expanded state and naturally snaps back or returns to its natural state. Specifically, in its natural state, the membrane 16 can have cross-sectional sizes identical to or slightly smaller than the rigid mandrel 14 and/or the rigid mandrel 14 with the composite material 12 thereon. Thus, the rigid mandrel 14 and the composite material 12 thereon may require the membrane 16 to be in its inflated or expanded state in order for the rigid mandrel 14 and the composite material 12 to fit therein. In embodiments where the cross-section of the composite part or the rigid mandrel 14 can vary, the minimum cross-sectional size of the membrane 16 can be equal to or smaller than the maximum cross-sectional size of the rigid mandrel 14 and/or the rigid mandrel 14 with the composite material 12 thereon. Furthermore, the membrane 16 can also have an embossed inner surface to allow air between the membrane 16 and the composite material 12 to escape evenly as the membrane 16 releases back toward its natural state, compressing the composite material 10.

While inflation or expansion of the membrane 16 can be created using a pressure differential, as later described herein, in some alternative embodiments, expansion of the membrane 16 can be accomplished via one or more mechanical expanding devices (not shown). For example, the membrane 16 may be formed to include loops, protrusions, or the like (not shown) on an outer surface thereof to which the one or more mechanical expanding devices can attach and then pull the membrane 16, expanding it in multiple directions.

In yet another alternative embodiment, the membrane 16 in the natural state can have a cross-section or diameter that is sized for the composite material 12 and the rigid mandrel 14 to fit therein, pre-stretching or expansion, and then when axially stretched in opposing axial directions from ends of the membrane 16, the membrane 16 can have a stretched cross-section or diameter that is smaller than the combined cross section of the composite material 12 and the rigid mandrel 14. Thus, to bring the membrane into contact with the composite material and/or to apply compressive force to the composite material, the membrane 16 in this alternative embodiment is axially stretched in opposing directions and secured in that stretched configuration during curing of the composite part. This similarly avoids wrinkles or pleats from the membrane 16. The axial stretching can be applied using any mechanical tooling suitable for clamping onto opposing ends of the membrane 16 and pulling from either or both ends in an axial direction.

Figure 3:
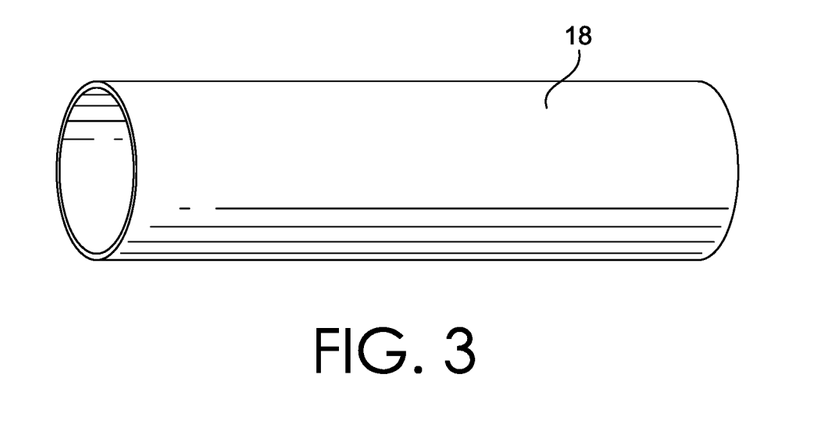
FIG. 3 is a perspective view of a rigid external vessel to which the hollow membrane of FIG. 2 can be inserted in accordance with embodiments of the present invention.

As depicted in FIG. 3, the system 10 can further include a rigid external vessel 18. The rigid external vessel 18 can have a cross-section greater than the membrane 16, the composite material 12, and the rigid mandrel 14. For example, the rigid external vessel 18 can have a minimum cross-sectional size that is larger than the maximum cross-sectional size of the rigid mandrel such that the rigid mandrel fits within the rigid external vessel. The membrane 16 can be located within the rigid external vessel 18 and can be configured to be sealed to the rigid external vessel 18. For example, end portions of the hollow membrane 16 can be sealed to an inner surface or any surface of the rigid external vessel 18 at or proximate to opposing ends thereof. When a pressure differential is applied, such as via autoclave pressure and/or drawing vacuum from between the membrane 16 and the rigid external vessel 18 via a vacuum port or the like, the membrane 16 can then be inflated or expanded into its inflated or expanded state.

The membrane 16 can be sealed to the rigid external vessel 18 using a mechanical sealing mechanism, sealant tape, mud, or any sealant known in the art. The membrane 16 can be stretched to the rigid external vessel 18 or sealing mechanism for sealing thereto. Additionally or alternatively, end segments of the membrane 16 can be molded or formed such that, in a natural state, have a greater cross-sectional area than a middle segment of the membrane 16. That is, the end segments at or proximate to opposing ends of the membrane 16 can have a first cross-section approximately equal to or greater than the cross-sectional area of the rigid external vessel 18, and then taper down to the middle segment of the membrane 16 which can have a second cross-sectional area that is smaller than the first cross-sectional area.

With end portions sealed to the rigid external vessel 18, the hollow membrane 16 is inflatable from its natural state to its inflated or expanded state via a pressure differential drawing the hollow membrane 16 toward the rigid external vessel 18. As noted above, the minimum cross-sectional size of the hollow membrane 16 in the natural state is equal to or smaller than the maximum cross-sectional size of the rigid mandrel 14 (or at least smaller than the maximum cross-sectional size of the rigid mandrel 14 with the composite material 12 thereon). On the other hand, the minimum cross-sectional size of the hollow membrane 16 in the inflated or expanded state is larger than the maximum cross-sectional size of the rigid mandrel 14 in combination with the composite material 12 thereon and allows for clearance of the rigid mandrel 14 into the hollow membrane 16.

In some embodiments, the rigid external vessel 18 can also be a cure vessel, such as one made of autoclave material. That is, the rigid external vessel 18 can be used as a heat enclosure and the rigid mandrel 14 can also be heated for cure of the composite material 12. The plumbing, such as at least one vacuum or vent port 22 and other autoclave or cure vessel features can also be included as part of the rigid external vessel 18, as depicted in the last step of FIG. 4. Additionally or alternatively, the rigid external vessel 18 can be configured as a pressure vessel for a pressurized cure of the composite material 12. That is, the rigid external vessel 18 can be configured to provide heat and/or pressure during curing of the composite material 12 on the rigid mandrel 14 to form the composite part.

Additionally or alternatively, the system 10 can include a source of heat or electricity (not shown) that is physically and/or electrically coupled to the rigid mandrel 14 (such as in the case of joule heating thereof) and/or to the rigid external vessel 18. Additionally or alternatively, the heat source can include an outer autoclave into which the rigid external vessel 18 is placed. The source of heat or electricity may generate sufficient heat to cure, melt, and/or fuse the composite material 13.

Figure 4:
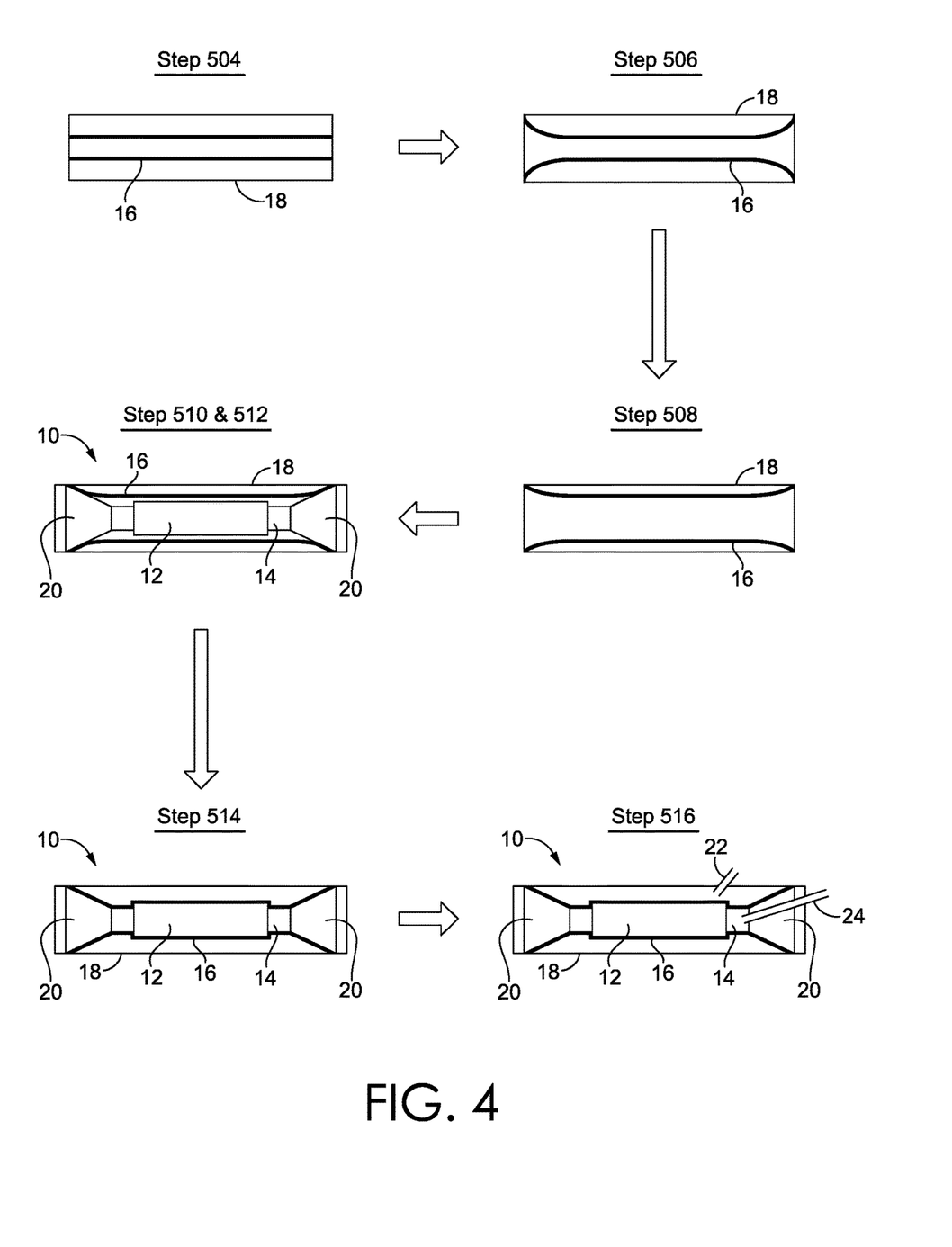
FIG. 4 is a schematic flow chart of a method of using the rigid mandrel, hollow membrane, and rigid external vessel of FIGS. 1-3 in accordance with embodiments of the present invention.

In some embodiment, as depicted in FIG. 4, the system 10 can comprise one or more plugs 20. For example, two plugs 20 can be inserted into the rigid external vessel 18 and/or the two opposing ends or openings of the membrane 16. In some embodiments, the plugs 20 can each be tapered toward and abut against or attach to the rigid mandrel 14, thus centering and holding the rigid mandrel 14 within the external vessel 18. Additionally or alternatively, at least one of the plugs can be attached or integrally formed with the rigid mandrel 14, providing ease of insertion and placement into the rigid external vessel 18 and/or the membrane 16. In some embodiments, as depicted in the last step of FIG. 4, at least one of the plugs 20 can include a vacuum or vent port 24 for assisting with pressure and compression of the composite material 12 during curing thereof.

Figure 5:
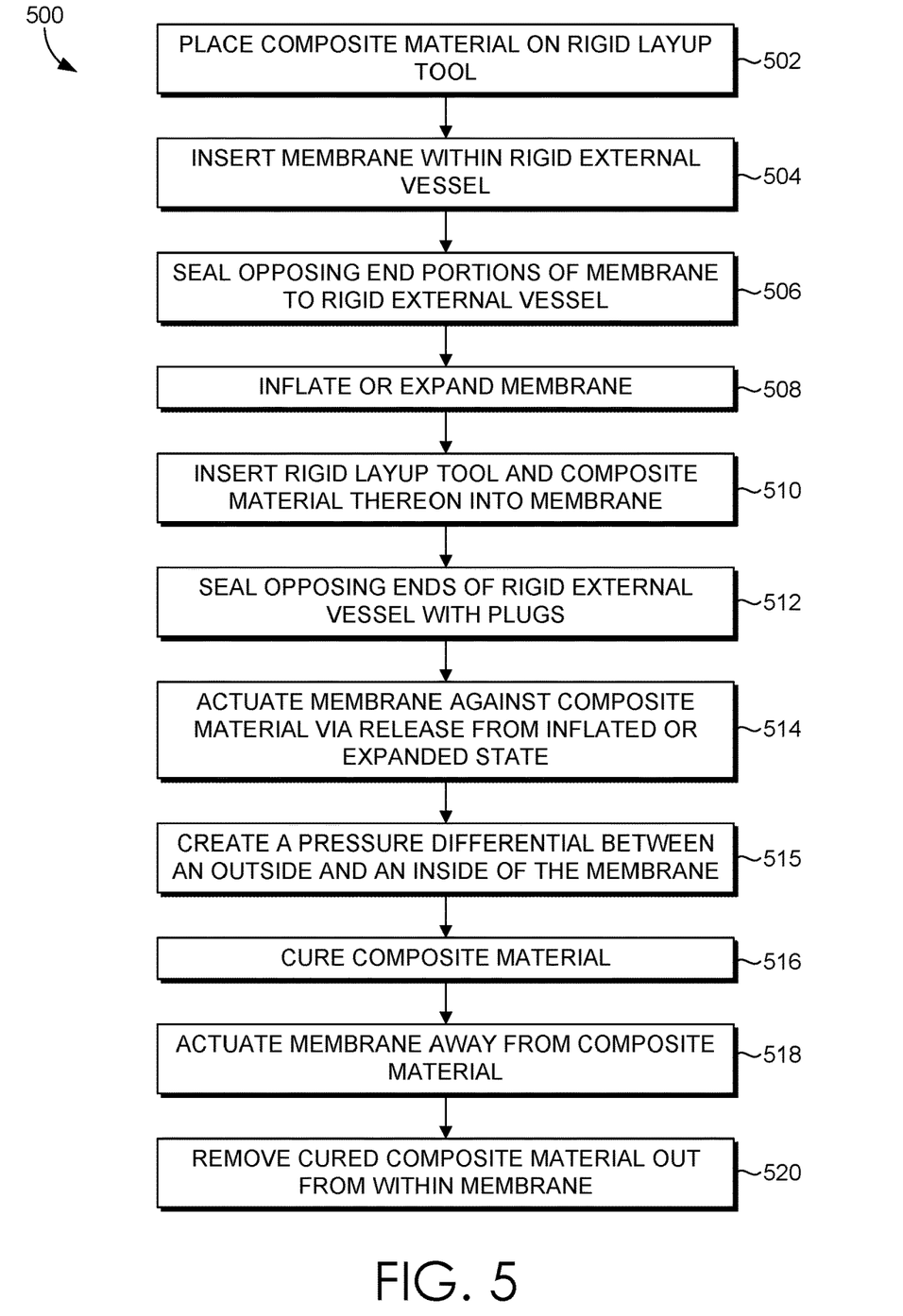
FIG. 5 is an exemplary method of manufacturing a composite part in accordance with embodiments of the present invention.

At least a portion of the steps of a method 500 for manufacturing a composite part using the system 10 in accordance with various embodiments of the present invention is listed in FIG. 5. The steps may be performed in the order as shown in FIG. 5, or they may be performed in a different order. Further, some steps may be performed concurrently as opposed to sequentially. In addition, some steps may be omitted. Still further, embodiments of the present invention may be performed using systems other than system 10 without departing from the scope of the technology described herein. Furthermore, FIG. 4 is a visual flow chart pictorially depicting a plurality of the steps of method 500, as described in detail herein.

In some embodiments of the invention, as depicted in block 502, the method 500 can include a step of placing the composite material 12 on a rigid layup tool such as the rigid mandrel 14 described herein. As noted above, the composite material may be an uncured composite material wrapped around the rigid mandrel 14 or can alternatively include cured and/or uncured composite parts for co-bonding or co-curing the composite material 12 together. In some embodiments, a cumulative cross-section of the rigid mandrel 14 and the composite material 12 placed thereon can have a maximum cross-sectional size sufficient to fit within the membrane 16 in its inflated or expanded state.

In some embodiments, the method 500 can include the steps of inserting the membrane 16 within the rigid external vessel 18, as depicted in block 504, and sealing opposing end portions of the membrane 16 to the rigid external vessel 18, as depicted in block 506. This can be accomplished with an epoxy or sealant or with some type of mechanical sealing device. However, the method 500 can be performed without these steps if the membrane 16 and rigid external vessel 18 are pre-made. Once the membrane 16 is sealed to the rigid external vessel 18, this combined component can be used and reused numerous times due to the reusability of the elastomeric membrane 16.

The method 500 can also include the steps of inflating or expanding the membrane 16, as depicted in block 508, and inserting the rigid layup tool, such as the rigid mandrel 14 with the composite material 12 thereon, into the membrane 16 while it remains inflated or expanded, as depicted in block 510. The membrane 16 can be inflated or expanded from its natural state having a smaller cross-sectional size to its inflated or expanded state having a larger cross-sectional size. In some embodiments, the smaller cross-sectional size of the membrane 16 in its natural state can be less than the cumulative cross-sectional size of the rigid mandrel 14 combined with the composite material 12 thereon. Thus, the step of inflating or expanding the membrane allows for the insertion of the rigid mandrel 14 and the composite material 12 thereon.

Inflating or expanding the membrane 16 can include, for example, changing a pressure differential between the rigid external vessel and the membrane 16. Because the membrane 16 is a stretchable and reusable elastomeric material, changing the pressure differential inflates the membrane into an inflated or expanded state. Additionally or alternatively, inflating or expanding the membrane can include expanding the membrane 16 from its natural state to the inflated or expanded state using mechanical stretching of the membrane 16 outward to allow a greater clearance for insertion of the rigid layup tool or rigid mandrel 14 and the composite material 12 thereon.

Inserting the rigid layup tool and the composite material 12 into the membrane 16 can result in the rigid layup tool or rigid mandrel 14 being located within a hollow tube membrane, for example, or between at least two opposing surfaces of the membrane 16 while the membrane 16 is in the inflated or expanded state. Thus, a cross-sectional size (e.g., distance, area, etc.) of the membrane 16 in the inflated or expanded state is greater than the cumulative cross-sectional size of the rigid mandrel 14 and the composite material 12 together. For example, if the rigid mandrel 14 is cylindrical in shape with composite material wrapped there around, the membrane 16 can also be designed to have at least a middle portion thereof that is cylindrical, and in the inflated or expanded state, the membrane 16 can have a diameter that is greater than a cumulative diameter of the rigid mandrel 14 combined with the composite material wrapped there around.

The method 500 can further comprise a step of sealing opposing ends of the rigid external vessel 18 with the plugs 20, as depicted in block 512. The plugs 20 can mate with or abut against the rigid layup tool (e.g., the rigid mandrel 14) and hold the rigid layup tool or rigid mandrel 14 in place relative to the rigid external vessel 18. In some embodiments, the plugs 20 can also seal the rigid external vessel 18, particularly in embodiments where the rigid external vessel 18 is also a pressure vessel or autoclave for use during curing of the composite part.

The method 500 can further include a step of actuating the membrane 16 from the inflated or expanded state toward its natural state, as depicted in block 514. This actuating can include a step of releasing the membrane 16 (e.g., releasing the vacuum that was drawn to inflate the membrane 16) such that it naturally/automatically returns toward its natural state. The composite material 12 and the rigid mandrel 14 can prevent the membrane 16 from returning entirely to its natural state. However, the force exerted by the membrane 16 as it naturally attempts to return to its natural state provides a force that compresses the composite material 12 against the rigid mandrel 14. Because no excess material is being folded, pleated, or wrinkled using this technique, the composite material 12 is thereby compressed without the membrane 16 causing wrinkles or mark-offs on the composite material 12 during cure thereof. Note that, in some embodiments, the membrane 16 can be molded to have a hollow shape corresponding to a shape of the composite material 12 on the rigid mandrel 14, such that if the cross-sectional size in one or more areas along a length of the rigid mandrel 14 is different than in another area along the length of the rigid mandrel 14, the membrane 16 can be likewise molded proportionally thereto. This can provide for a more even pressure against the composite material 12 with an even stretching of the membrane 16 across the composite material 12.

In an alternative embodiment (not shown) of the method 500, the step in block 508 of inflating or expanding the membrane 16 can be omitted, such as in embodiments in which the first configuration of the membrane is its natural state and axial pulling/stretching of the membrane is used for composite material compression. In this alternative embodiment, the actuating step depicted in block 514 comprises actuating the membrane 16 from a first configuration toward a second configuration, where the membrane 16 in the first configuration has a cross-sectional size that is greater than a cross-sectional size of the membrane 16 in the second configuration. However, unlike the embodiments described above, the first configuration in this embodiment is a natural state or an unstretched state and the second configuration is an axially-stretched state achieved by pulling opposing ends of the membrane 16 in opposite directions axially. This axially stretching results in a smaller cross-section than the cumulative cross-section of the rigid mandrel 14 and the composite material thereon, which thus compresses the composite material thereon without the membrane 16 causing wrinkles or mark-offs on the composite material.

The method 500 can also comprise the steps of creating a pressure differential between an outside and an inside of the membrane 16, as depicted in block 515, and curing the composite material 12, as depicted in block 516. For example, creating a pressure differential can be accomplished by pulling vacuum between the membrane 16 and the composite material 12, such as via the vacuum or vent port 24. This can assist in assuring the membrane 16 completely conforms to the composite material 12 and that air is removed from the composite material 12. Additionally or alternatively, the pressure differential can be provided by applying pressure from an autoclave and venting the membrane 16 to atmosphere.

Furthermore, curing the composite material 12 can include heating the composite material 12 to a cure temperature while the composite material 12 is compressed by the membrane 16. This curing can be accomplished using any pressurizing and heating methods known in the art of composite part manufacturing. In some embodiments, the rigid mandrel 14 can be heated via joule heat to cure the composite part. Additionally or alternatively, the rigid external vessel 18 can serve as the autoclave and can provide pressure and/or heat for curing the composite material 12 into the composite part.

Finally, the method 500 can include the steps of actuating the membrane away from the composite material 12 following curing and subsequent cooling thereof, as depicted in block 518, and removing the cured composite material out from within the membrane 16, as depicted in block 520. Actuating the membrane away from the composite material 12 can include to stretching or releasing the membrane 16. For example, stretching the membrane 16 via inflation of the membrane 16 similar or identical to the manner described for step 508 can actuate the membrane 16 away from the cured composite part. Alternatively, for embodiments in which compressing of the composite material 12 is achieved through pulling of the membrane 16, releasing of the membrane 16 can result in the membrane 16 returning to its natural state in which its cross-sectional size is greater than the cumulative cross-sectional size of the rigid mandrel 14 and the composite material 14 thereon, now cured. This allows for easy removal of the cured composite part, which can then be removed off of the rigid mandrel 14 using any techniques known in the art.

Figure 6:
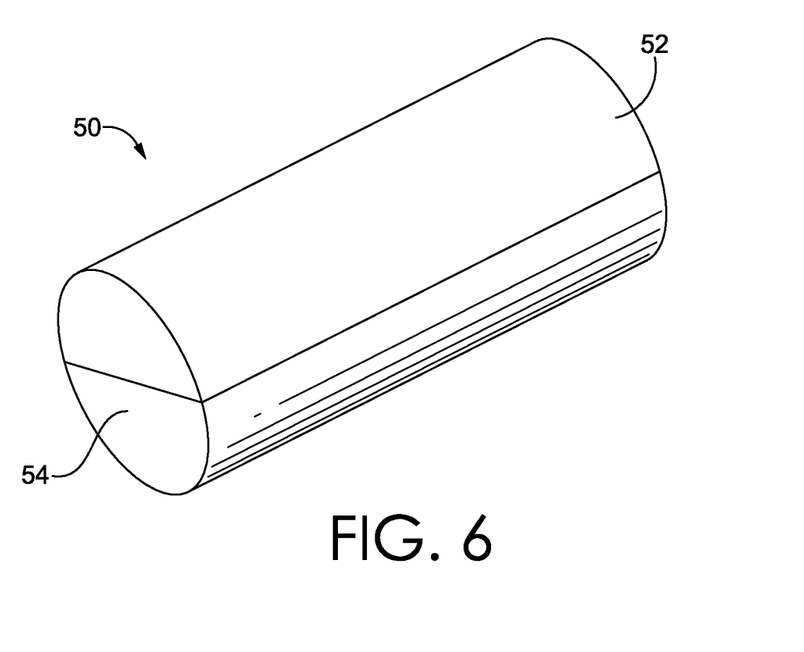
FIG. 6 is a perspective view of a self-contained cure vessel split to mechanically open in accordance with embodiments of the present invention.
Figure 8:
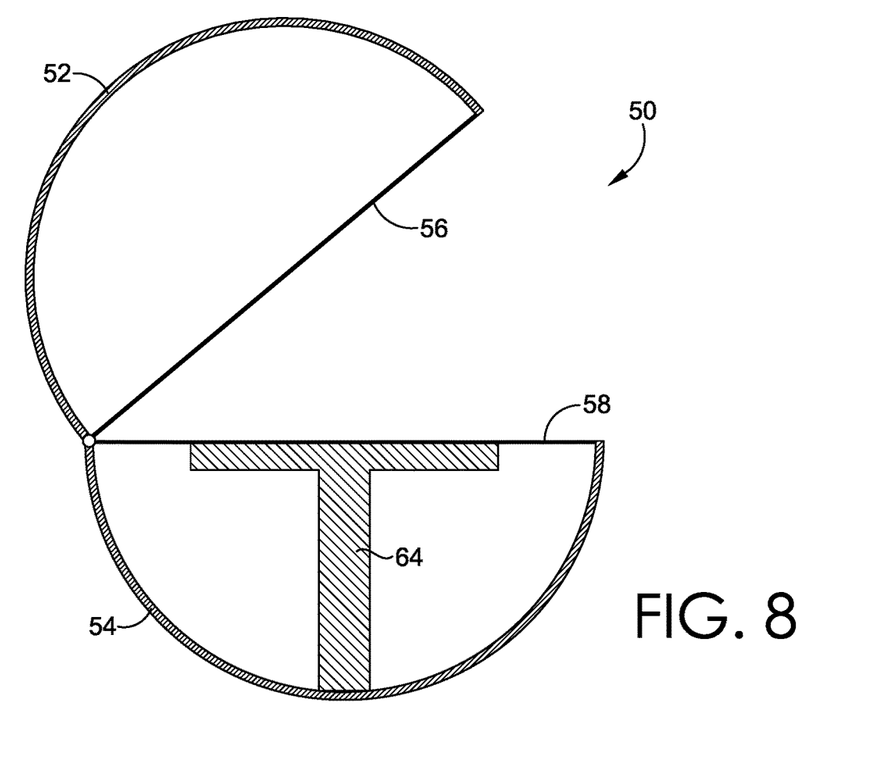
FIG. 8 is an end plan view of the self-contained cure vessel of FIG. 6 in an open configuration with two membrane sheets therein in accordance with embodiments of the present invention.
Figure 9:
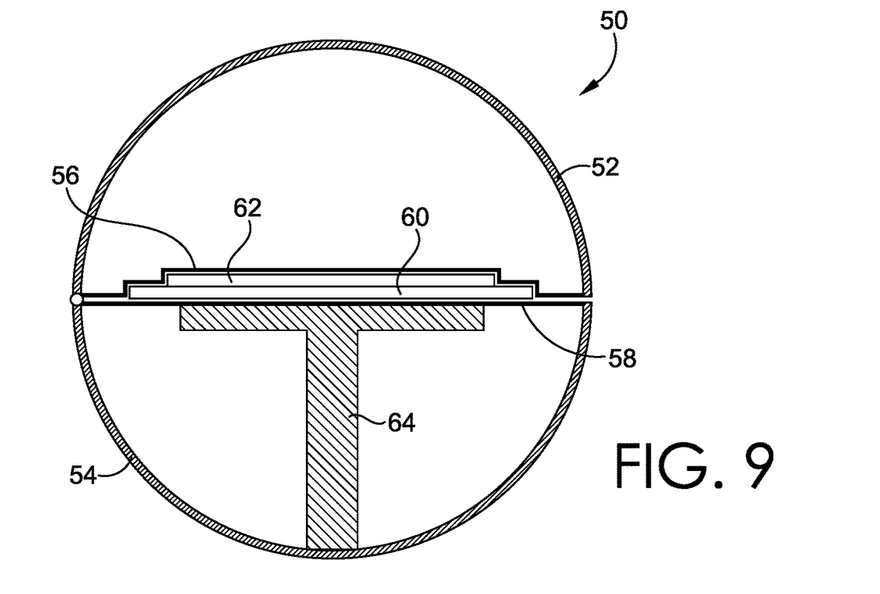
FIG. 9 is an end plan view of the self-contained cure vessel of FIG. 8 in a closed configuration with the composite material on the rigid layup tool of FIG. 7 positioned between the two membrane sheets.

The embodiments herein take advantage of the elastomeric membrane's stretching properties to allow for bagging or compression of the composite material for curing thereof without creating bag pleats or wrinkles that traditionally create mark-off on the composite part surface formed thereby. This is similarly achieved in an alternative embodiment depicted in FIGS. 6-9. Specifically, as depicted in FIG. 6, a self-contained cure vessel 50 is split in two mating components 52,54 pivotally attached to each other, thereby openable in a clamshell-type configuration. As depicted in FIGS. 8-9, each of the mating components comprise membrane sheets 56,58 that are made of the same elastomeric material described above for the membrane 16.

Figure 7:
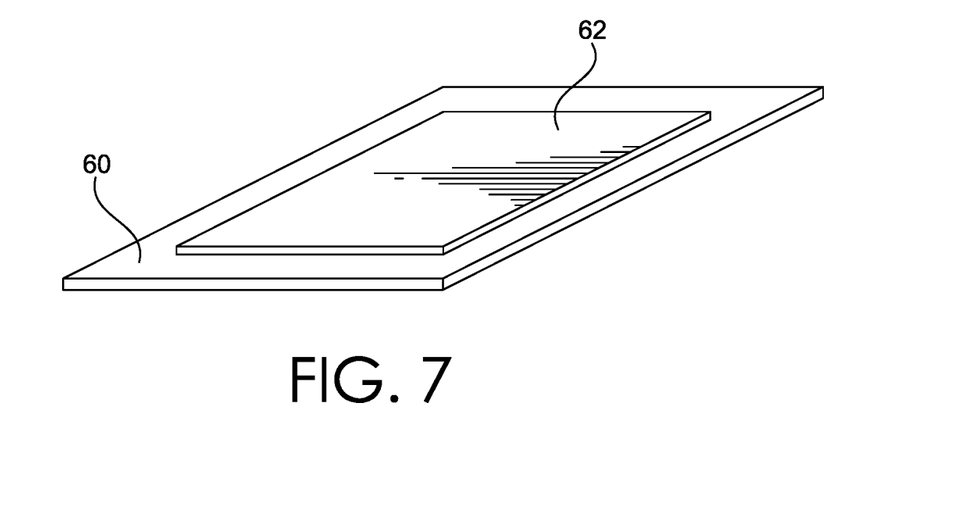
FIG. 7 is a perspective view of composite material on a rigid layup tool in accordance with embodiments of the present invention.

The membrane sheets 56,58 can be substantially parallel to each other when the cure vessel 50 is closed, and can pivot away from each other as the cure vessel 50 is opened. When the cure vessel 50 is closed, the membrane sheets 56,58 can be a first distance apart from each other. When the cure vessel 50 is opened, as depicted in FIG. 8, a rigid layup tool 60 with composite material 62 placed thereon, as depicted in FIG. 7, can be placed onto one of the membrane sheets 56,58. A thickness of the rigid layup tool 60 and the composite material 62 can be greater than the first distance apart of the membrane sheets 56,58 when the cure vessel 50 is closed. Thus, when the cure vessel 50 is subsequently closed, as in FIG. 9, with the rigid layup tool 60 and the composite material 62 therein, at least one of the membrane sheets 56,58 flex or stretch around the rigid layup tool 60 and the composite material 62, thus providing compressive force to the composite material 62 for curing via any of the techniques described above.

In some embodiments, a frame member 64 can be mounted within one of the two matting components 52,54 and can support at least one of the membrane sheets 56,58, as depicted in FIGS. 8-9. Alternatively, the frame member 64 can replace one of the membrane sheets 56,58, such that only one of the membrane sheets 56,58 is used to compress the composite material 62 when the cure vessel 50 is closed. The alternative embodiments depicted in FIGS. 6-9 utilize the stretching properties of the one or more membrane sheets 56,58 to allow for bagging or compression of the composite material 62 for curing thereof without creating bag pleats or wrinkles that traditionally create mark-off on the composite part surface formed thereby.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

A method for manufacturing composite parts, the method comprising: placing composite material on a rigid layup tool; inserting the rigid layup tool and the composite material within a hollow, stretchable membrane while the membrane is in a first configuration; actuating the membrane from the first configuration toward a second configuration, wherein a cross-section of the membrane in the second configuration is smaller than the cross-section of the membrane in the first configuration, and the cross-section of the membrane in the second configuration corresponds to the rigid layup tool and the composite material there on, wherein: actuating the membrane involves releasing the membrane from the first configuration, wherein in the first configuration the membrane is in an inflated or expanded state and in the second configuration the membrane is in a natural state achieved upon releasing the membrane from the inflated or expanded state, or actuating the membrane involves axially pulling the membrane, wherein the first configuration is the natural state and the second configuration is an axially-stretched state achieved by pulling opposing ends of the membrane in opposite directions axially; and heating the composite material to a cure temperature while the composite material is compressed by the membrane.

2. The method of clause 1, wherein the rigid layup tool is a rigid mandrel and the composite part is wrapped around the rigid mandrel.

3. The method of any one of clauses 1 and 2, wherein the membrane has two opposing ends with two opposing openings there formed.

4. The method of clause 3, further comprising placing the membrane in a rigid external vessel, sealing end portions of the membrane to the rigid external vessel, and changing a pressure differential between the rigid external vessel and the membrane prior to inserting the rigid layup tool and the composite material within the membrane, wherein changing the pressure differential inflates the membrane toward the rigid external vessel into the first configuration.

5. The method of clause 4, further comprising sealing opposing ends of the rigid external vessel with plugs that mate with or abut against the rigid layup tool and hold the rigid layup tool in place relative to the rigid external vessel.

6. The method of any one of clauses 4 and 5, wherein the rigid external vessel is an autoclave used as a source of at least one of heat and pressure during the step of heating the composite material.

7. The method of any one of clauses 1-6, further comprising creating a pressure differential between an outside and an inside of the membrane prior to the heating of the composite material, cooling the composite material following the heating thereof, actuating the membrane to stretch or release away from the composite material, and removing the cured composite material out from within the membrane.

8. The method of any one of clauses 1-7, wherein the membrane is an elastomeric material.

9. The method of any one of clauses 1-8, wherein the membrane is molded to have a hollow shape corresponding to a shape of the composite material on the rigid layup tool.

10. A method for manufacturing composite parts, the method comprising the steps of: placing composite material around a rigid mandrel; expanding a hollow membrane from a natural state to an inflated or expanded state, wherein in the natural state the membrane has a cross-section smaller than a cross-section of the rigid mandrel with the composite material thereon and in the inflated or expanded state the membrane has a cross-section larger than the cross-section of the rigid mandrel with the composite material thereon; inserting the rigid mandrel and the composite material into the membrane while the membrane is in the inflated or expanded state; releasing the membrane from the inflated or expanded state, wherein releasing the membrane causes it to naturally contract toward its natural state and compress the composite material against the rigid mandrel; and curing the composite material while the composite material is compressed by the membrane.

11. The method of clause 10, further comprising sealing end portions of the membrane to a rigid external vessel, wherein the expanding step comprises changing a pressure differential between the rigid external vessel and the membrane.

12. The method any one of clauses 10 and 11, further comprising sealing opposing ends of the rigid external vessel.

13. The method of clause 12, wherein sealing opposing ends of the rigid external vessel includes inserting plugs into the opposing ends of the rigid external vessel.

14. The method of clause 13, wherein the plugs center and hold the rigid mandrel within the rigid external vessel.

15. The method of any one of clauses 10-14, further comprising creating a pressure differential between an outside and an inside of the membrane prior to the curing of the composite material, cooling the composite material following the curing thereof, expanding the membrane away from the composite material, and removing the cured composite material out of the membrane.

16. The method of any one of clauses 10-15, wherein the membrane is an elastomeric material.

17. A composite curing system comprising: a rigid mandrel having a maximum cross-sectional size, wherein the rigid mandrel is configured for placement of composite material thereon; a rigid external vessel having a minimum cross-sectional size that is larger than the maximum cross-sectional size of the rigid mandrel such that the rigid mandrel fits within the rigid external vessel; and a hollow membrane made of elastomeric material and having two opposing ends at which two opposing openings are formed, wherein the hollow membrane is located within and sealed to the rigid external vessel at or proximate to the two opposing ends of the hollow membrane, wherein the hollow membrane is inflatable from a natural state to an inflated or expanded state via a pressure differential drawing the hollow membrane toward the rigid external vessel, wherein a minimum cross-sectional size of the hollow membrane in the natural state is equal to or smaller than the maximum cross-sectional size of the rigid mandrel and a minimum cross-sectional size of the hollow membrane in the inflated or expanded state is larger than the maximum cross-sectional size of the rigid mandrel and allows clearance of the rigid mandrel into the hollow membrane.

18. The composite curing system of clause 17, further comprising two plugs insertable into the rigid external vessel and the two opposing ends of the hollow membrane.

19. The composite curing system of clause 18, wherein the two plugs are tapered toward and abut against or attach to the rigid mandrel, centering and holding the rigid mandrel within the rigid external vessel.

20. The composite curing system of any one of clauses 17-19, wherein the rigid external vessel is an autoclave having at least one vacuum port and configured to provide at least one of heat and pressure during curing of a composite part on the rigid mandrel.

The following claims are presented with single dependencies to comply with U.S. practice. However, unless the features of the claims are incompatible, it is envisaged that any claim may be dependent upon any one, or any combination, of the preceding claims.

The invention claimed is:

1. A method for manufacturing composite parts, the method comprising:
   placing composite material on a rigid layup tool;
   inserting the rigid layup tool and the composite material within a hollow, stretchable membrane while the membrane is in a first configuration, wherein the membrane has two opposing ends with two opposing openings there formed;
   actuating the membrane from the first configuration toward a second configuration, wherein a cross-section of the membrane in the second configuration is smaller than the cross-section of the membrane in the first configuration, and the cross-section of the membrane in the second configuration corresponds to the rigid layup tool and the composite material there on, wherein:
      actuating the membrane involves axially pulling the membrane, wherein the first configuration is the natural state and the second configuration is an axially-stretched state achieved by pulling opposing ends of the membrane in opposite directions axially;
   placing the membrane in a rigid external vessel, and sealing end portions of the membrane to the rigid external vessel;

and
heating the composite material to a cure temperature while the composite material is compressed by the membrane.

2. The method of claim 1, wherein the rigid layup tool is a rigid mandrel and the composite part is wrapped around the rigid mandrel.

3. The method of claim 1, further comprising sealing opposing ends of the rigid external vessel with plugs that mate with or abut against the rigid layup tool and hold the rigid layup tool in place relative to the rigid external vessel.

4. The method of claim 1, wherein the rigid external vessel is an autoclave used as a source of at least one of heat and pressure during the step of heating the composite material.

5. The method of claim 1, further comprising creating a pressure differential between an outside and an inside of the membrane prior to the heating of the composite material, cooling the composite material following the heating thereof, actuating the membrane to stretch or release away from the composite material, and removing the cured composite material out from within the membrane.

6. The method of claim 1, wherein the membrane is an elastomeric material.

7. The method of claim 1, wherein the membrane is molded to have a hollow shape corresponding to a shape of the composite material on the rigid layup tool.

8. A method for manufacturing composite parts, the method comprising the steps of:
placing composite material around a rigid mandrel;
inserting the rigid mandrel and the composite material into a hollow membrane in a natural state;
pulling the membrane in opposing directions axially from a first configuration into a second configuration, wherein the first configuration is the natural state and the second configuration is an axially-stretched state achieved by pulling opposing ends of the membrane in opposite directions axially, wherein a cross-section of the membrane in the second configuration is smaller than the cross-section of the membrane in the first configuration, and the cross-section of the membrane in the second configuration compresses the composite material against the rigid mandrel;
sealing end portions of the membrane to a rigid external vessel; and
curing the composite material while the composite material is compressed by the membrane.

9. The method of claim 8, further comprising sealing opposing ends of the rigid external vessel.

10. The method of claim 9, wherein sealing opposing ends of the rigid external vessel includes inserting plugs into the opposing ends of the rigid external vessel.

11. The method of claim 10, wherein the plugs center and hold the rigid mandrel within the rigid external vessel.

12. The method of claim 8, further comprising cooling the composite material following the curing thereof, releasing axial pulling of the membrane such that the membrane expands away from the composite material while returning to the first configuration, and removing the cured composite material out of the membrane.

13. The method of claim 8, wherein the membrane is an elastomeric material.

* * * * *